UNITED STATES PATENT OFFICE.

JOSEPH WALWYN WHITE, OF WIDNES, ENGLAND.

LUBRICATION OF MACHINERY.

1,377,866.  Specification of Letters Patent.  Patented May 10, 1921.

Application filed May 29, 1920. Serial No. 385,305.

*To all whom it may concern:*

Be it known that I, JOSEPH WALWYN WHITE, subject of the King of Great Britain, residing at Widnes, in the county of Lancaster and Kingdom of England, have invented certain new and useful Improvements in and Relating to the Lubrication of Machinery, of which the following is a specification.

The present invention relates to improvements in the lubrication of the bearing surfaces of machinery.

In bearings under heavy pressure, it is sometimes difficult to maintain an effective film of oil between moving parts such as a revolving shaft and the fixed bush of the bearing, as the pressure on the shaft squeezes the oil away from between the two bearing surfaces and owing to the tightness of the fitting between the shaft and the bearing, it is difficult to get the film of oil back again between the two surfaces.

According to the present invention one or more grooves of extremely flat V section or ratchet section are cut in one or both of the bearing parts of a machine, to present an inclined plane, in one or both directions of motion. As applied to a rotating shaft, a shallow groove is cut either on the gearing surface of the shaft or on the exterior cylindrical surface of the journal or on both of these surfaces, one of the sides of which grooves in the bearing are tangential to the periphery of the shaft. Such arrangements are distinct from the arrangement of radial grooves of wedge shaped cross section to retain lubricant which has been applied to collar or step bearings, or shafts rotating constantly in one direction of motion.

Under the influence of the moving parts such as a revolving shaft, lubricant is drawn along each inclined plane into the adjacent bearing surface and there forms an effective film of lubricant acting something like rows of minute roller bearings, between each of the separate bearing portions of the bearing itself, and by the time the film of oil has been forced out of the space between the bearing surfaces of shaft and bearing, a fresh film will have been drawn in from an adjacent inclined plane trough.

It is true that by this arrangement the actual load bearing surface in the bearing is reduced, as compared with a full surface plain bearing but the advantage gained by an ample supply of lubricating film between these load bearing surfaces more than compensates for this, and in any case the bearing surfaces in contact are very much greater than in roller bearings or ball bearings, while the film of lubricant acts in very much the same manner as the roller bearings.

The present invention is more particularly described with reference to the accompanying drawings in which:—

Figure 1:
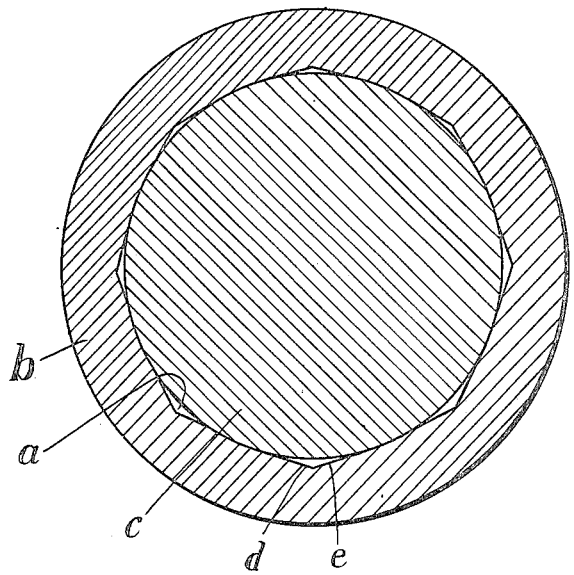
Figure 1 is a diagrammatic sectional end view of a shaft in a bearing.
Figure 2:
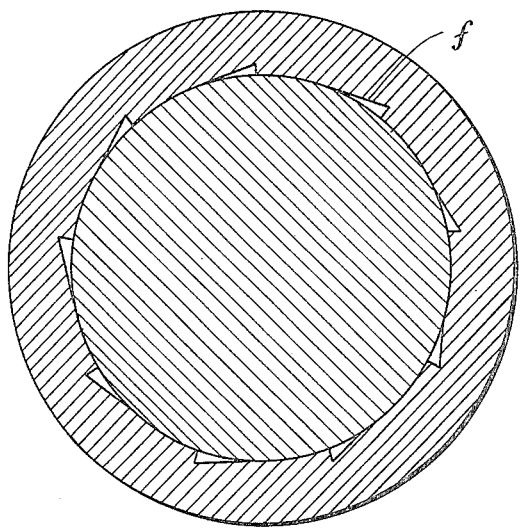
Fig. 2 is a similar view of a modification.

In the arrangement shown in Fig. 1, troughs *a* are cut in the bearing *b* having sides substantially tangential to the cylindrical surfaces of the rotating shaft *c*. The two side surfaces of these troughs *d*, *e*, may be similar so that the arrangement will funcion in either direction of motion of the shaft *c* relatively to the bearing *b*. In the arrangement shown in Fig. 2, however the troughs *f* are arranged for one direction of rotation only and are bounded by two surfaces, one of which is tangential to the surface of the shaft while the other is radial thereto.

These troughs may be arranged spirally around the bearing if desired and may lead into annular grooves so that the lubricant will not escape axially of the shaft.

Figure 3:
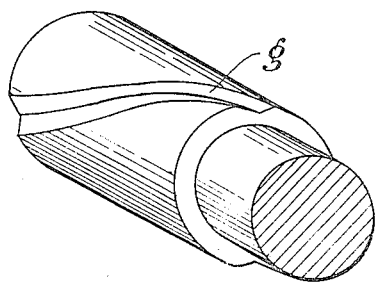
Fig. 3 is a perspective view of a further modification.

In the modification shown in Fig. 3, the trough is arranged as a spiral groove *g* in the surface of the shaft itself which would then coöperate with a cylindrical uninterrupted bearing.

The lubricant may be supplied to the trough by means of perforations running down the shaft or bearing and extending radially into the troughs so that the supply of lubricant to these is maintained.

Of course the amount of gradient or angle of the inclined surfaces would be very small, and would probably vary somewhat with the circumferential speed of the shaft as well as the load on it, the idea being to so regulate the angle or slope of the inclined plane as to readily draw in the oil between the bearing surfaces, and so forming a kind of "forced-pressure" lubrication.

Instead of putting the inclined planes in the bearing, they might be even more effective if they were put around the shaft itself, as the oil would more readily be drawn around and into the bearing surfaces, by the positive action of the revolving shaft.

I declare that what I claim is:—

1. A lubricating device for machinery comprising curved parts moving relatively to one another and having small grooves cut in one of the contacting surfaces, one side of which is tangential to the curved surface with large intermediate uninterrupted surfaces supporting the load intermediate the grooves.

2. A lubricating device for machinery including a rotating shaft and a journal therefor, small grooves being cut in one of the cylindrical bearing surfaces, one side of which is tangential to the bearing surfaces while the other side is radial thereto leaving large intermediate uninterrupted cylindrical surfaces.

In witness whereof I have hereunto signed my name this 9th day of April, 1920, in the presence of two subscribing witnesses.

JOSEPH WALWYN WHITE.

Witnesses:
H. HIRK,
J. McLACHLEN.